United States Patent
Roptin

(10) Patent No.: US 11,914,149 B2
(45) Date of Patent: Feb. 27, 2024

(54) SYSTEM FOR GENERATING A VIRTUAL IMAGE FOR A WEARER

(71) Applicant: Essilor International, Charenton-le-Pont (FR)

(72) Inventor: Vincent Roptin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 677 days.

(21) Appl. No.: 17/051,372

(22) PCT Filed: May 10, 2019

(86) PCT No.: PCT/EP2019/062012
§ 371 (c)(1),
(2) Date: Oct. 28, 2020

(87) PCT Pub. No.: WO2019/215314
PCT Pub. Date: Nov. 14, 2019

(65) Prior Publication Data
US 2021/0231954 A1    Jul. 29, 2021

(30) Foreign Application Priority Data
May 11, 2018 (EP) .................... 18305581

(51) Int. Cl.
*G02B 27/01* (2006.01)
*G02C 7/14* (2006.01)
(52) U.S. Cl.
CPC .......... *G02B 27/0172* (2013.01); *G02C 7/14* (2013.01); *G02B 2027/0178* (2013.01); *G02B 2027/0187* (2013.01)

(58) Field of Classification Search
CPC ........ G02B 27/0172; G02B 2027/0178; G02B 2027/0181; G02B 2027/0187; G02C 7/14
See application file for complete search history.

(56) References Cited

U.S. PATENT DOCUMENTS

| 2014/0049451 A1 | 2/2014 | Sugiyama et al. |
| 2016/0216515 A1 | 7/2016 | Bouchier et al. |

(Continued)

FOREIGN PATENT DOCUMENTS

| WO | WO 2015/032828 A1 | 3/2015 |
| WO | WO 2016/156614 A1 | 10/2016 |
| WO | WO 2018/022521 A1 | 2/2018 |

OTHER PUBLICATIONS

International Search Report and Written Opinion dated Jul. 23, 2019 in PCT/EP2019/062012 filed May 10, 2019.

*Primary Examiner* — Ryan D Howard
(74) *Attorney, Agent, or Firm* — Oblon, McClelland, Maier & Neustadt, L.L.P.

(57) ABSTRACT

A system for generating a virtual image for a wearer includes: a lens providing vision of a real scene and having refractive power related to the prescription of the wearer, a directive light source that emits directive light beams to create the virtual image, a reflecting element positioned on or in the lens that receives and redirects the directive light beams emitted by the directive light source toward a convergence area of an eye of the wearer, a dynamical optical element for modifying the received light beams, and a memory storing prescription data relative to the prescription of the wearer, the dynamical optical element modifying the light beams at the convergence area so as to compensate at least partly the prescription of the wearer.

14 Claims, 1 Drawing Sheet

(56) References Cited

U.S. PATENT DOCUMENTS

2016/0252726 A1\* 9/2016 Ishida .................. G02B 26/101
  345/8
2018/0095279 A1 4/2018 Bouchier et al.
2018/0136486 A1 5/2018 Macnamara et al.

\* cited by examiner

SYSTEM FOR GENERATING A VIRTUAL IMAGE FOR A WEARER

TECHNICAL FIELD

The invention relates to a system for generating a virtual image for a wearer, a method for generating a virtual image for a wearer and a computer program product.

BACKGROUND OF THE INVENTION

Patent application WO 2016/081888 discloses an eyewear equipment including a holographic mirror and a micro display to provide a virtual image to the wearer of the eyewear equipment.

The micro display includes a movable/changeable power lens, that allows, in synchronization with a light source, to modifying the focal point of the light source, so that the light rays issued from the light source and after reflection on a holographic mirror are collimated.

Such eyewear equipment provides improved virtual images to the wearer. For instance, the focal distance of the virtual image can match the focal distance of a targeted object in the real scene; this is convenient for augmented reality purpose.

However, such prior art eyewear equipment fails to consider the ophthalmic prescription of the wearer.

The eyewear equipment disclosed in WO 2016/081888 is supposed to provide image sharpness, independently of the ophthalmic prescription of the wearer, because the depth of view is important.

However, the inventors have observed that the absence of ophthalmic prescription consideration reduces visual sharpness, for instance when ametropia becomes high, or even when ametropia is low, it introduces additional loss in image sharpness.

Therefore, it appears that there is a need for a system for generating a virtual image for a wearer that would take into account the ophthalmic prescription of the wearer.

A goal of the invention to provide an improved system for generating a virtual image for a wearer that would take into account the ophthalmic prescription of the wearer.

SUMMARY OF THE INVENTION

To this end, the invention proposes a system for generating a virtual image for a wearer, the system comprising:
- a lens providing vision of real scene and having refractive power related to the prescription of the wearer,
- a directive light source configured to emit directive light beams to create the virtual image,
- a reflecting element positioned on or in the lens and configured to receive and redirect the directive light beams emitted by the directive light source toward a convergence area of an eye of the wearer,
- a dynamical optical element for modifying received light beams,
- a memory storing prescription data relative to the prescription of the wearer, wherein the dynamical optical element is configured to modify the light beams at the convergence area so as to compensate at least partly the prescription of the wearer.

The system for generating a virtual image of the invention compensate at least partly the ophthalmic prescription of the wearer, in particular the dynamical optical element is controlled in a particular manner so that reflected wave front reaching the eye of the wearer compensates the ophthalmic prescription of the wearer. Advantageously, the quality of the virtual image perceived by the wearer, in particular the sharpness of the virtual image is improved.

According to further embodiments which can be considered alone or in combination:
- the dynamical optical element is configured to modify at least the spherical power component of the wave front of the received light beams at the convergence area so as to compensate at least partly the spherical prescription of the wearer; and/or
- the dynamical optical element is further configured to modify the cylindrical power component of the wave front of the received light beams at the convergence area so as to compensates at least partly the cylindrical prescription of the wearer; and/or
- the dynamical optical element is further configured to modify the wave front of the received light beams at the convergence are so as to compensates at least partly the addition of the prescription of the wearer; and/or
- the directive light source comprises at least a light source configured to emit light beams and a scanning element configured to receive the light beams and to reflect the received light beams; and/or
- the system is configured so that the scanning element receives light beams modified by the dynamical optical element; and/or
- the scanning element is a mirror; and/or
- the scanning element is configured to move in at least two perpendicular direction, for example vertical and horizontal; and/or
- the dynamical optical element is further configured to modify the received light beams at the convergence area according to the scanning element position and/or the reflecting element characteristics and the prescription of the wearer; and/or
- the system further comprises means configured to determine the current position of the convergence area, the means being configured to interact with the dynamic optical element in order to modify the convergence of the light as a function of the prescription of the wearer and of the current position of the convergence area; and/or
- the dynamical optical component is a movable optical lens; and/or
- the dynamical optical component is a spatial light modulator; and/or
- the dynamical optical component is a deformable optical lens; and/or
- the dynamical optical component is a deformable optical mirror; and/or
- the prescription of the wearer comprise prescription for different gazing distance, the system further comprises a gazing distance determining mean, the dynamical optical element is configured to modify the wave front of the received light beam at the convergence area according to the prescription of the wearer corresponding to the gazing distance determined by the gazing distance determining mean.

The invention also relates to a method for generating a virtual image for a wearer, the method comprising:
- a system providing step during which a system according to the invention is provided to the wearer, the system having prescription data stored in the memory relative to the prescription of the wearer,
- a dynamical optical element controlling step during which the dynamical optical element of the system is controlled to modify the received light beams at the convergence area so as to compensate at least partly the prescription of the wearer.

The invention further relates to a computer program product comprising one or more stored sequences of instructions that are accessible to a processor and which, when executed by the processor, causes the processor to carry out at least the dynamical optical element controlling step of the method of the invention.

The invention also concerns a non-transitory computer-readable storage medium comprising instructions that, when executed by a processor, cause the processor to carry out at least the dynamical optical element controlling step of the method of the invention.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a system, for example an eyewear equipment, for generating a virtual image of a wearer.

In the reminder of the description, terms like «up», «bottom», «horizontal», «vertical», «above», «below», «front», «rear» or other words indicating relative position may be used. These terms are to be understood in the wearing conditions of the system or eyewear equipment of the invention.

Figure 1:
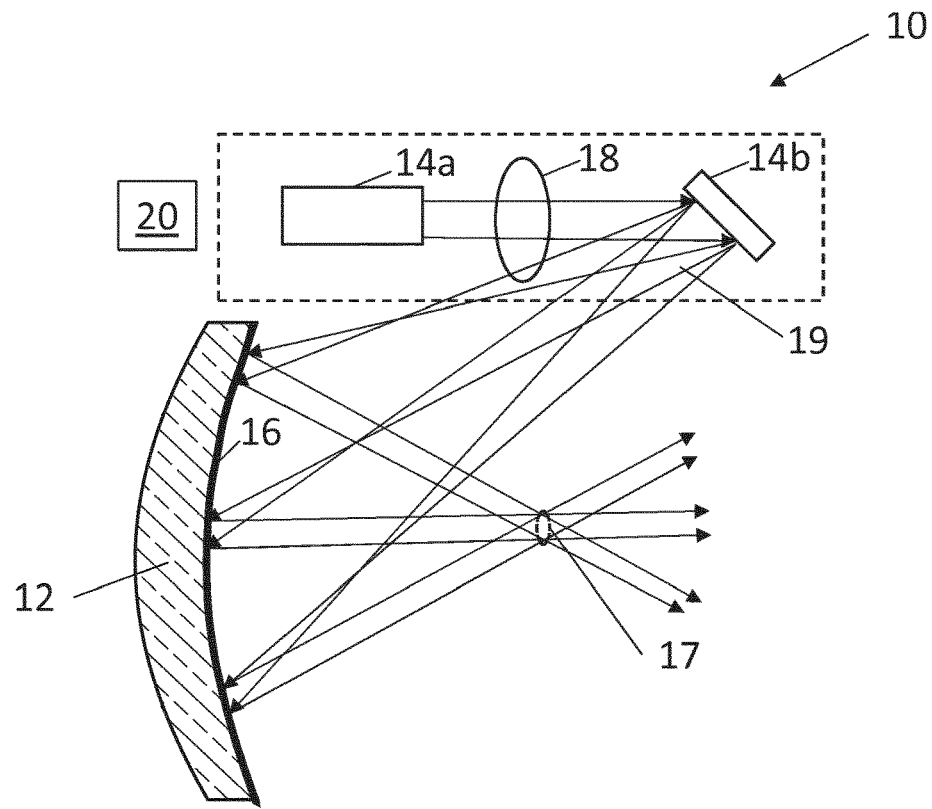
FIG. 1 illustrates a system according to the invention.

As illustrated on FIG. 1, the invention relates to system 10 for generating a virtual image for a wearer. Preferably, the system 10 of the invention is part of an eyewear equipment intended to be worn by a wearer.

The system according to the invention comprises at least:
a lens 12,
a directive light source 14a, 14b,
a reflecting element 16,
a dynamical optical element 18, and
a memory 20 storing prescription data relative to the prescription of the wearer.

The lens 12 provides vision of real scene to the wearer and has refractive power related to the prescription of the wearer.

On FIG. 1, the lens 1 is represented with a convex front surface or object surface and a concave back surface or eye surface. However, it will be appreciated that theses surfaces could equally well be of any other curved surface. The lens 12 preferably has an optical power that corrects user refraction error, so that user can see clearly his/her real visual environment.

The term "prescription" is to be understood to mean a set of optical characteristics of optical power, of astigmatism, of prismatic deviation, determined by an ophthalmologist or optometrist in order to correct the vision defects of the wearer, for example by means of a lens positioned in front of his eye. For example, the prescription for a myopic eye comprises the values of optical power and of astigmatism with an axis for the distance vision.

The directive light source is configured to emit directive light beams to create the virtual image.

As illustrated on FIG. 1, the light source may comprise a light source 14a and a scanning element 14b.

The light source 14a is configured to emit light beams.

In some examples, the light source 14a may be a laser, a superluminescent diode (SLED), a microLED, a resonant-cavity light emitting diode (RCLED), a vertical-cavity surface-emitting laser (VCSEL) light source, or the like. In some examples, the light source 14a may be a single light source or may be multiple light sources. In some examples, where multiple light sources are provided, optical coupling devices may be provided. For example, a beam combiner and/or dichroic plates may be provided.

The scanning element 14b is configured to receive the light beams and to reflect the received light beams.

According to a preferred embodiment, the scanning element 14b receives light beams modified by the dynamical optical element 18.

The scanning element 14b may be mirror, for example configured to move is at least two perpendicular direction, for example vertical and horizontal.

The scanning element 14b may be arranged to be rotated about two mutually orthogonal axes. In some examples, the scanning element 14b may rotate about one axis. In some examples, the scanning element 14b may comprise two mirrors, where each mirror rotates about one axis. In particular, each mirror may rotate about mutually orthogonal axes.

With some examples, the scanning element 14b may scan the light beam at a speed of 1 kHz to 80 kHz per line in a first direction, for example a horizontal direction.

In some examples, the scanning element 14b may scan the at a speed of 1 Hz to 200 Hz per line in a second direction perpendicular to the first direction, for example in a vertical direction. Accordingly, an image can be generated by raster scanning the pixels of the entire image, line by line. After which, scanning element 14b returns to an original position. This period is called a flyback period where no image is projected during the flyback period. With some examples, an interlaced projection may be implemented, for example, where the image is projected from top to bottom and then from bottom to top. In some examples, a Lissajou-type projection technique may be implemented, for example, to include higher horizontal and vertical axis frequencies (e.g., from 600 Hz to 80 kHz for each axis, or the like).

The reflecting element 16 is positioned on or in the lens 12. In the embodiment illustrated on FIG. 1, the reflecting element 16 is positioned on the back surface of the lens 12. However, the invention is not limited to such embodiment, in particular the reflecting element 16 may be positioned on the front surface of the lens 12 or embodied in the lens 12 between the front and back surfaces.

The reflecting element 16 is configured to receive and redirect light beams emitted by the directive light source 14 toward a convergence area 17 of an eye of the wearer of the system of the invention.

When the reflecting element 16 is embodied in the lens 12 or positioned on the front or back surface of the lens 12, dioptric reflective and/or refractive deviations may occur because of the dioptric of the lens 12, in particular because of the shapes and relative position of the front and back surfaces of the lens 12. Such dioptric deviation changes the wave front reaching the eye of the wearer.

The geometry of the reflecting element 16 also impacts the wave front reaching the eye of the wearer. For example, if the reflecting element is on the back surface of the lens 12 and the back surface of the lens 12 provides at least part of the dioptric function for the real scene, the reflecting element 16 has a complex curvature, for example not constant and depending on the position on the back surface.

Therefore, when the light beams reach the eye of the wearer, the wave front coming into the eye is not flat but has some spherical and/or torical or even higher order components.

The spherical/torical or higher order components also depend on the position of the scanning element 14b. Therefore, reflection in two different positions on the reflecting element 16 may not provide the same components.

The dynamical optical element 18 is configured to modify the received light beams at the convergence area 17 so as to compensate at least partly the prescription of the wearer. Data relative to the prescription of the wearer are stored in the memory 20.

In other words, the dynamical optical element 18 of the system of the invention a movable and/or changeable component so as to modify the wave front of the light beam in way that after reflection on the reflecting element 16 the wave front components entering the eye compensate the prescription of the wearer of the system of the invention.

This modification of the wave front of the light beam can also be applied on a system with multiple exit pupils. Multiple exit pupils is a solution to a common challenge in head worn display: to avoid bulky solution, the simple exit pupil of the optical system, also called eye motion box as this is the place where the eye of the wearer has to be position to see the virtual image, is often of reduced size. It can be relevant to expand the eye motion box by multiplying the exit pupil rather to enhance the size of a single exit pupil. One example of such system with multiple exit pupil is described in US2016033771A1.

The dynamical optical element 18 may be a movable optical lens and/or a deformable lens and/or a deformable optical mirror.

In some examples, the dynamical optical element 18 may comprise an electro-active polymer. As such, applying electric current to the dynamical optical element 18 may physically deform the dynamical optical element 18 and consequently the displacement of the dynamical optical element 18 can be varied. In some examples, the dynamical optical element 18 may be a piezo-actuated rigid or polymer lens, in which the lens is actuated with a driving signal to cause the lens to physically move to a different location. In some examples, the driving signal may be provided by a controller (not represented on FIG. 1). Generally speaking, the dynamical optical element 18 can be a SLM (spatial light modulator) having the property of modifying the phase distribution of the light beams.

According to an embodiment of the invention, the dynamical optical element is configured to modify at least the spherical power component of the wave front of the received light beams at the convergence area 17 so as to compensate at least partly the spherical prescription of the wearer. In the sense of the invention, compensating at least partly the spherical prescription is to be understood as compensating between 1% and 200% of the spherical prescription, for example between 50% and 100% of the spherical prescription.

The dynamical optical element may be configured to modify the cylindrical power component of the wave front of the received light beams at the convergence area so as to compensates at least partly the cylindrical prescription of the wearer in addition or independently of the spherical prescription the wearer.

For instance, if a wearer has a prescription having a cylinder C with and axis A, it is preferable that the wave front provide to the wearer a cylinder C' equal to C with an Axis A' equal to A. A partial correction may be for instance providing a cylinder C' smaller or greater than C, such that a residual cylinder Cres=abs(C−C') is smaller than C (abs (C−C')<C). More generally, a partial correction is defined such that residual prescription error, i.e. the difference between the wearer prescription and the correction provided by the wave front, has an amplitude or variance smaller than the amplitude or variance of the wearer prescription.

The dynamical optical element is further configured to modify the wave front of the received light beams at the convergence are so as to compensates at least partly the addition of the prescription of the wearer in addition or independently of the spherical prescription and/or the cylindrical prescription of the wearer.

A partial compensation of addition corresponds to providing a positive addition that is smaller than or equal to the addition of the prescription of the wearer. It may be for instance of at least 0.5D, preferably of at least half of the addition of the prescription of the wearer, and more preferably of at least 80% of the addition of the prescription.

For example, if the wearer prescription corresponds to a −1D sphere, the dynamical component 18 is driven so that the light after reflexion on the reflecting element 16 provides a wave front having a spherical component, with convergence −1 m, ie 1 m in front of the wearer for all scan positions on the reflecting element 16.

For example, if the wearer need +3D power (hypermetropics), the dynamical component 18 is driven so that for all scan position on the reflecting element 16, the wave front converges 33 cm behind the eye of the wearer.

The dynamical optical element may further be configured to modify the received light beams at the convergence area according to the scanning element position and/or the reflecting element characteristics and the prescription of the wearer.

The reflecting element characteristics may comprise for example the position of the lens 12 and/or the geometry of the front and/or rear surfaces of the lens 12 and/or the refractive index of the lens 12 when the reflecting element is either in the lens or on the front surface of the lens.

The driving of the movable/changeable lens can be adapted for different gazing situation of the wearer.

For example, if the lens 12 is a single vision lenses:
when the wearer looks at far distance, for example greater than or equal to 4 meters, the wave front components compensate for far vision prescription;
when the wearer looks at near distance, for example smaller than or equal to 1 meter, the wave front components compensate for far distance prescription and proximity of real scene.

Advantageously, both real scene and virtual image are seen with best sharpness.

According to an embodiment of the invention, the refraction of the wearer may be input directly from the prescription from an ophthalmologist or optometrist or an optician. It may be also directly determined by the wearer himself, for example the dynamical optical element may be configured to propose different correction corresponding to different refraction, and the wearer can select the most appropriate for him, and them store this specific configuration.

According to an embodiment of the invention, the system of the invention may further comprise means configured to determine the current position of the convergence area. Such means are configured to interact with the dynamic optical element in order to modify the convergence of the light as a function of the prescription of the wearer and of the current position of the convergence area.

According to an embodiment of the invention, the prescription of the wearer comprise prescription for different gazing distance. The system of the invention may further comprise a gazing distance determining mean, the dynamical optical element is configured to modify the wave front of the received light beam at the convergence area according to the prescription of the wearer corresponding to the gazing distance determined by the gazing distance determining mean.

Although not represented on FIG. 1, the system according to the invention may be included in a wearable head mounted device, for example a pair of glasses, also referred to as spectacles, such as for example reading glasses, sunglasses, smart glasses or the like. In particular the system according to the invention may be part of a augmented and/or virtual reality spectacles.

Figure 2:
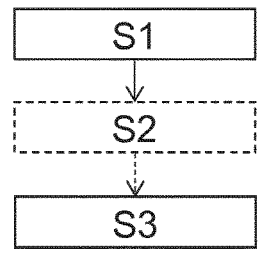
FIG. 2 is a flowchart of different steps of a method according to the invention.

As illustrated on FIG. 2, the invention further relates to a method for generating a virtual image for a wearer.

The method of the invention comprises at least:
a system providing step S1, and
a dynamical optical element controlling step S3.

During the system providing step S1 a system according to the invention is provided to a wearer. The system is provided with prescription data stored in the memory relative to the prescription of the wearer.

Other data may be stored in the memory of the provided system, for example data useful for further calculation, in particular it is recommended to have rule giving the wave front deformation reaching the eye when no change/motion is applied on the dynamical optical element component, and how the driving of the dynamical optical element changes the wave front reaching the eye Such data may be determined from a ray tracing of the complete optical system, including all position/optical characteristic of the different elements.

During the dynamical optical element controlling step S3, the dynamical optical element of the system is controlled to modify the received light beams at the convergence area so as to compensate at least partly the prescription of the wearer.

As illustrated on FIG. 2, the method of the invention may further comprise prior to the dynamical optical element controlling step S3 a condition of use determining step S2.

During the condition of use determining step S2, the conditions of use of the system of the invention may be determined. In particular, does the wearer look at near/far, intermediate distance. This may be determined using an inclinometer, or telemeter, or from the eye convergence using an eye tracker.

The condition of use may be considered when controlling the dynamical optical element of the system during the dynamical optical element controlling step S3.

Figure 3:
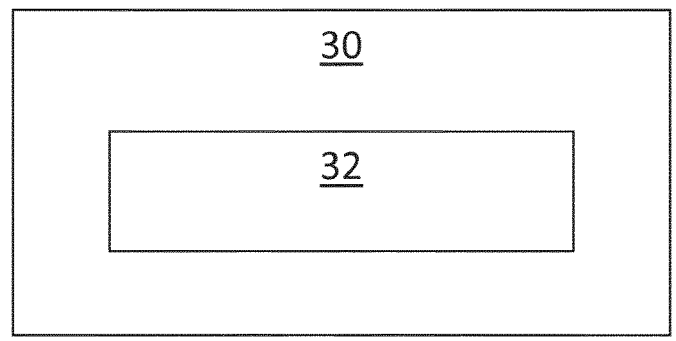
FIG. 3 illustrates a computer readable medium according to an embodiment.

FIG. 3 illustrates an embodiment of a storage medium 30. The storage medium 30 may comprise an article of manufacture. In some examples, the storage medium 30 may include any non-transitory computer readable medium or machine readable medium, such as an optical, magnetic or semiconductor storage. The storage medium 30 may store computer executable instructions 32 that, when executed by a processor, cause the processor to carry out at least the dynamical optical element controlling step of the method of the invention.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A system for generating a virtual image for a wearer, the system comprising:
a lens providing vision of real scene and having refractive power related to a prescription of the wearer,
a directive light source configured to emit directive light beams to create the virtual image,
a reflecting element positioned on or in the lens and configured to receive and redirect the directive light beams emitted by the directive light source toward a convergence area of an eye of the wearer,
a dynamical optical element for modifying received light beams,
a memory storing prescription data relative to the prescription of the wearer,
wherein the dynamical optical element is configured to modify the light beams at the convergence area so as to compensate at least partly the prescription of the wearer,
wherein the directive light source comprises at least a light source configured to emit light beams and a scanning element configured to receive the light beams and to reflect the received light beams, and
wherein the system is configured so that the scanning element receives light beams modified by the dynamical optical element.

2. The system according to claim 1, wherein the dynamical optical element is configured to modify at least a spherical power component of a wave front of the received light beams at the convergence area so as to compensate at last partly a spherical prescription of the wearer.

3. The system according to claim 1, wherein the dynamical optical element is further configured to modify a cylindrical power component of a wave front of the received light beams at the convergence area so as to compensates at least partly a cylindrical prescription of the wearer.

4. The system according to claim 1, wherein the dynamical optical element is further configured to modify a wave front of the received light beams at the convergence are to compensate at least partly an addition of the prescription of the wearer.

5. The system according to claim 1, wherein the scanning element is a mirror.

6. The system according to claim 1, wherein the scanning element is configured to move in at least two perpendicular direction.

7. The system according to claim 1, wherein the dynamical optical element is further configured to modify the received light beams at the convergence area according to the scanning element position and/or the reflecting element characteristics and the prescription of the wearer.

8. The system according to claim 1, further comprising means configured to determine the current position of the convergence area, the means being configured to interact with the dynamic optical element in order to modify the convergence of the light as a function of the prescription of the wearer and of the current position of the convergence area.

9. The system according to claim 1, wherein the dynamical optical element is a movable optical lens.

10. The system according to claim 1, wherein the dynamical optical element is a deformable optical lens.

11. The system according to claim 1, wherein the dynamical optical element is a deformable optical mirror.

12. The system according to claim 1, wherein the prescription of the wearer comprise prescription for different gazing distance, the system further comprises a gazing distance determining mean, the dynamical optical element is configured to modify a wave front of the received light beam at the convergence area according to the prescription of the wearer corresponding to the gazing distance determined by the gazing distance determining mean.

13. A method for generating a virtual image for a wearer, the method comprising:
 a system providing step during which a system according to claim 1 is provided to the wearer, the system having prescription data stored in the memory relative to the prescription of the wearer,
 a dynamical optical element controlling step during which the dynamical optical element of the system is controlled to modify the received light beams at the convergence area so as to compensate at least partly the prescription of the wearer.

14. The system according to claim 6, wherein the at least two perpendicular directions are vertical and horizontal.

* * * * *